3,103,534
PRODUCTION OF ALPHA-MONOCHLORO-
CARBOXYLIC ACIDS
Otto von Schickh and Horst Metzger, Ludwigshafen
(Rhine), Germany, assignors to Badische Anilin- &
Soda-Fabrik Aktiengesellschaft, Ludwigshafen (Rhine),
Germany
No Drawing. Filed Apr. 5, 1960, Ser. No. 20,008
Claims priority, application Germany Apr. 22, 1959
6 Claims. (Cl. 260—523)

This invention relates to a new process for the production of alpha-monochlorocarboxylic acids hereinafter briefly referred to as alpha-chlorocarboxylic acids. More specifically, this invention relates to the production of alpha-chlorocarboxylic acids by the oxidation of readily available initial materials not hitherto used for this purpose.

Prior to this invention alpha-chlorocarboxylic acids have commonly been prepared by the chlorination of carboxylic acids. This method has the disadvantage that a non-unitary reaction mixture is obtained as the chlorine also partly enters the beta-position of the carboxylic acids and as a polychlorination also occurs in addition to the monochlorination. Another disadvantage of the said prior art chlorination is that satisfactory results are obtained only when a catalyst is used. The catalysts most useful for the purpost are phosphorus and phosphorus compounds. Unfortunately, however, the phosphorus compounds, whether added to the carboxylic acid or formed during the chlorination, are difficult to remove from the reaction product as they often tenaciously adhere to the monochlorocarboxylic acid when this is being distilled.

It is an object of this invention to provide a process which is generally applicable for the production of alpha-chlorocarboxylic acids and in which alpha-monochlorocarboxylic acids are obtained in good yields and without the formation of undesirable beta- and/or polychlorinated carboxylic acids as by-products. Another object of the invention is to provide a process for the production of alpha-chlorocarboxylic acids in the practice of which no difficultly removable catalysts are required. Still another object of the invention is to provide a process for the production of alpha-chlorocarboxylic acids which starts from readily accessible and cheap initial materials and can readily be carried out on an industrial scale. A further object is to widen the basis of tht initial materials for the production of alpha-chlorocarboxylic acids and to make use of those substances which are cheap and can be readily converted into alpha-chlorocarboxylic acids and therefore render the process especially economical and simple.

According to the present invention the said objects are achieved by allowing nitric acid with a concentration of at least about 30% by weight to act on a bis-(1-nitroso-2-chloro-hydrocarbon) of the general formula:

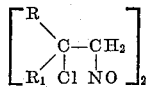

in which R and R₁ represent hydrogen, alkyl, cycloalkyl or aryl groups or together with the carbon atom bearing R and R₁ form a five- to eight-membered cycloalkyl ring substituted by the chlorine atom. Those bis-(1-nitroso-2-chlorohydrocarbons) are preferred in which the radicals R and R₁ are equal or different, representing hydrogen or alkyl groups with up to 16 carbon atoms, especially alkyl groups with up to 5 carbon atoms, or also phenyl radicals.

Bis-(1-nitroso-2-chlorohydrocarbons) which are particularly useful in the practice of our invention are the bis-(1-nitroso-2-chloroalkanes) which contain only aliphatically combined carbon atoms. Although in principle bis-(1-nitroso-2-chloroalkanes) with any number of carbon atoms are suitable as initial materials, there may be mentioned especially from the series of the bis-(1-nitroso-2-chloroalkanes), in so far as they are of purely aliphatic nature, those with up to 18 carbon atoms, of which in turn the preferred compounds are those with 2 to 7 carbon atoms. As representatives of the purely aliphatic bis-(1-nitroso-2-chlorohydrocarbons) the following are given by way of example:

Bis-(1-nitroso-2-chloroethane), bis-(1-nitroso-2-chloropropane), bis-(1-nitroso-2-chloro-2-methylpropane), bis-(1 - nitroso - 2 - chlorohexane), bis-(1-nitroso-2-chlorononane) and bis-(1-nitroso-2-chloroctadecane). From among the bis-(1-nitroso-2-chlorohydrocarbons) in which R and/or R₁ represent cycloalkyl those are preferred which contain a five- to eight-membered cycloalkyl radical. Other useful initial compounds, in addition to the purely aliphatic bis-(1-nitroso-2-chlorohydrocarbons), are, for example, bis-(1-nitrosomethyl-1-chlorocyclohexane), bis-(1-nitrosomethyl-1-chlorocyclooctane) and especially bis-(beta-nitroso-alpha-chloroethylbenzene).

The initial materials are readily available compounds and may be obtained in a simple way by adding nitrosyl chloride or substances which react in the same way as nitrosyl chloride to olefinic compounds which contain the unsaturated =CH₂ group, for example, a terminally unsaturated alkene. The term "substances which react in the same way as nitrosyl chloride" is meant to include e.g., approximately stoichiometric mixtures of an alkylnitrite and hydrogen chloride. In the process according to our invention, the relatively expensive carboxylic acids of the conventional process are replaced by the readily available and cheap olefins, of which many are obtainable, for example, by the cracking of paraffins.

Being dimeric chloronitroso compounds, the following formula is to be ascribed to the bis-(nitrosochlorohydrocarbons):

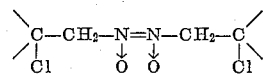

For the reaction, the nitric acid is used in a concentration of at least about 30% by weight, the remainder being water. It is preferable to work with about 40 to 100% by weight nitric acid. It is especially advantageous in general to use an acid of about 60 to 98%, especially 60 to 85%, strength. The most favorable acid concentration and the amount of the oxidizing agent are somewhat different for the individual bis-(nitrosochlorohydrocarbons). The most favorable concentration and amount can however readily be ascertained by preliminary experiment. As a rule, for each mol of the dimeric nitrosochlorohydrocarbon, there are used at least about 2, advantageously 4 to 10, mols of nitric acid. It is however possible to work with an even greater excess of nitric acid because a great excess of nitric acid, for example six to fifty times the amount theoretically necessary, is not deleterious for the reaction.

The preferred reaction temperature lies in the range of from about 0° to 50° C. Temperatures upwards of about 50° C. should not be applied because the formation of undesirable byproducts increases as the temperature is raised. A temperature between about 10° and 35° C. is especially preferred. In the usual case the process is carried out at atmospheric pressure.

The reaction proceeds exothermically in such a manner that 2 mols of a carboxylic acid are theoretically formed from one mol of bis-(nitrosochlorohydrocarbon) theoretically formed according to the following scheme:

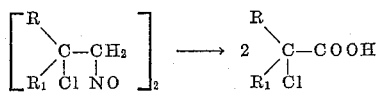

The reaction may be carried out, for example, by introducing the bis-(nitrosochlorohydrocarbon) into the nitric acid, preferably while stirring at a temperature of between 0° and about 10° C., then heating the mixture to a temperature up to 50° C., preferably a temperature of between 10° and 35° C. and allowing the reaction to proceed at this temperature. If necessary, cooling should be provided to discharge the reaction heat set free. The period necessary for the complete conversion, which may lie between 2 and 24 hours for example, depends to a large extent on the nitrosochloro compound to be reacted, on the nitric acid concentration and on the reaction temperature. The speed of reaction, given one and the same nitrosochlorohydrocarbon, generally increases as the temperature and the nitric acid concentration increase. If the reactants are brought together directly at temperatures up to about 50° C., the reaction proceeds rapidly and is almost completed after about ½ to 2 hours, i.e. practically when the reactants have been brought together. Organic solvents which are inert under the conditions of the process, as for example carbon tetrachloride, may be co-employed in the reaction. It has been found to be good practice to add to the nitric acid, prior to the reaction, small amounts, for example 1 to 25% by weight, of an alpha-chlorocarboxylic acid, advantageously the chlorocarboxylic acid to be prepared, with reference to the amount of nitric acid, because the reaction is thus more readily initiated. When no such addition is made it occasionally happens that the reaction after a certain delay occurs spontaneously and sometimes very violently.

The alpha-chlorocarboxylic acids may be recovered from the reaction mixture by conventional methods, for example by diluting the reaction mixture with water and, after separation of unreacted bis-(nitrosochlorohydrocarbon) if necessary, fractionally distilling the mixture under reduced pressure, or by extracting the reaction mixture, if necessary after further dilution with water, with extraction agents. Useful extraction agents are for example aromatic hydrocarbons, such as benzene, or ethers, such as diethyl ether, or halogenhydrocarbons, as for example carbon tetrachloride. The alpha-chlorocarboxylic acids are obtained by fractionally distilling the extract.

The process can be carried out continuously or discontinuously. The alpha-chlorocarboxylic acids obtained can be used for the known purposes. For example they can be used as pesticides, especially as herbicides, or for the production of alpha,beta-unsaturated carboxylic acids, and those alpha,beta-unsaturated acids which contain a vinyl group may be polymerized to plastics in conventional manner.

The following examples will further illustrate this invention but the invention is not restricted to these examples. The parts specified in the examples are parts by weight.

*Example 1*

60 parts of bis-(1-nitroso-2-chloro-2-methylpropane) of the melting point 103° C. are introduced in the course of 2 hours at 30° C. into 180 parts of 70% nitric acid while stirring. The mixture is stirred at 30° C. for another 5 hours and then poured onto ice. By filtration there are recovered 5.2 parts of unreacted organic initial material. The filtrate is extracted twice, each time with 200 parts of diethyl ether. From the combined extract solutions, after expelling the ether, there are obtained by distillation 43 parts of alpha-chloroisobutyric acid of the boiling point 83 to 85° C. at 10 mm. Hg and the melting point 31° C. With reference to the amount of reacted bis-(nitrosochloromethylpropane), the yield of alpha-chloroisobutyric acid is 78% of the theory.

By working in the same way under the same conditions and directly distilling under reduced pressure the filtrate obtained after separating the unreacted initial material, there are obtained 42.5 parts of alpha-chloroisobutyric acid boiling at 83° to 85° C. at 10 mm. Hg.

*Example 2*

60 parts of bis-(1-nitroso-2-chloro-2-methylpropane) are introduced while stirring at 0° to 5° C. in the course of about three hours into 150 parts of 80% nitric acid, the mixture is slowly heated to 20° C. and then stirred for another 17 hours at about 20° C. The mixture is poured onto ice and the filtrate extracted twice, each time with 200 parts of diethyl ether. From the ether extracts there are obtained 55.5 parts of alpha-chloroisobutyric acid of the boiling point 82° to 83° C. at 9 mm. Hg; this amounts to a yield of 92% of the theory.

By working in a corresponding way while using 90 parts of 80% nitric acid, there are recovered, after stirring the reaction mixture for 17 hours at about 20° C., 3.2 parts of the unreacted organic initial material. The yield of alpha-chloroisobutyric acid is 45.8 parts or 80.5% with reference to reacted organic initial material.

*Example 3*

40 parts of alpha-chloroisobutyric acid are added at 20° C. to 150 parts of 80% nitric acid, the mixture is cooled to 5° C. and 60 parts of bis-(1-nitroso-2-chloro-2-methylpropane) are introduced into the solution in the course of 1 hour while stirring. It is further worked up as descirbed in the first paragraph of Example 2 and, with complete conversion of the chloronitroso compound, 96.8 parts of alpha-chloroisobutyric acid of the boiling point 83° to 85° C. at 10 mm. Hg are obtained. Taking into account the amount of alpha-chloroisobutyric acid co-employed in the reaction, the yield is 94%.

By working in a corresponding way with the use of 150 parts of 60% nitric acid, there are obtained, after working up, 123.5 parts of alpha-chloroisobutyric acid, i.e. 81% of the theory.

*Example 4*

60 parts of 1-nitroso-2-chloro-2-methylpropane are introduced in the course of 5½ hours with powerful stirring and cooling into 180 parts of 98% nitric acid at 5° C. After stirring has been continued for another 3 hours at 20° to 25° C. to complete the reaction, the mixture is poured onto ice. By filtration 6.1 parts of unreacted chloronitroso compound are recovered. The working up of the filtrate takes place in the way described in detail in the first paragraph of Example 1. 46.2 parts of alpha-chloroisobutyric acid of the boiling point 83° to 85° C. at 10 mm. Hg are obtained. There are also obtained 3 parts of a fraction of the boiling point 132° to 135° C. at 10 mm. Hg which solidifies to form a crystalline compound of a composition not yet known. This compound melts at 101° C.

The yield of alpha-chloroisobutyric acid is 85% with reference to the amount of the chloronitroso compound reacted.

*Example 5*

40 parts of bis-(beta-nitroso-alpha-chloroethylbenzene) are introduced within an hour while stirring at 15° to 20° C. into 60 parts of 70% nitric acid. Stirring is continued for another 20 hours at about 30° C. and the mixture is then poured onto ice. The cold aqueous solution is extracted three times, each time with 150 parts of diethyl ether. The combined ethereal solutions are extracted twice with aqueous soda solution. After acidifying the alkaline aqueous extracts with dilute hydrochloric acid, the solution is exhaustively extracted with ether. The ether is evaporated. 18 parts of alpha-chlorophenylacetic acid remain. The yield is 45% of the theory. After recrystallization from petroleum ether, the product melts at 78° C.; the boiling point is 128° to 130° C. at 0.6 mm. Hg.

*Example 6*

60 parts of bis-(1-nitroso-2-chloro-2-methylpropane) are introduced into 180 parts of 98% nitric acid at 0° to 5° C. while stirring in the course of 5 hours, the mixture is slowly heated to 20° C. and stirred for another 10 hours at about 20° C. The mixture is poured onto ice and the filtrate extracted twice, each time with 200 parts of diethyl ether. From the ether extracts there are obtained 49 parts (81% of the theory) of alpha-chloroisobutyric acid of the boiling point 81° to 83° C. at 9 mm. Hg.

*Example 7*

54 parts of bis-(1-nitroso-2-chloropropane) are introduced into 150 parts of 80% nitric acid while stirring at 0° to 5° C. in the course of 2 hours, the mixture is slowly heated to 25° C. and stirred for another 15 hours at about 25° C. The mixture is poured onto ice and the filtrate shaken up twice, each time with 150 parts of methylene chloride. From the methylene chloride extracts there are obtained 46.7 parts of alpha-chloropropionic acid of the boiling point 180° C. at 760 mm. Hg; this is a yield of 86% of the theory.

*Example 8*

82 parts of bis-(1-nitroso-2-chloro-normal-heptane) are introduced in the course of about 2 hours into 200 parts of 80% nitric acid while stirring at 0° to 5° C., the mixture is slowly heated to 25° C. and stirred for another 20 hours at about 25° C. The mixture is poured onto ice and, after filtration, the filtrate shaken up twice, each time with 200 parts of methylene chloride. From the methylene chloride extracts there are obtained 67.5 parts (82% of the theory) of alpha-chloroheptanoic acid of the boiling point 108° to 110° C. at 1 mm. Hg.

We claim:

1. A process for production of alpha-chlorocarboxylic acids which comprises oxidizing a bis-(1-nitroso-2-chlorohydrocarbon) of the formula:

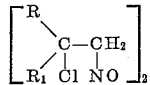

wherein R is a member selected from the group consisting of hydrogen, alkyl of 1–16 carbons and phenyl and $R_1$ is a member selected from the group consisting of hydrogen and alkyl of 1–16 carbons, with nitric acid having a weight concentration 60–100% at an oxidizing temperature between 0° C. and 50° C. wherein at least two mols of nitric acid are employed in said oxidation reaction for each mol of said bis-(1-nitroso-2-chlorohydrocarbon) to produce a carboxylic acid of the formula:

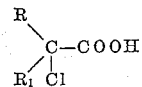

wherein R and $R_1$ have the significance aforedefined.

2. A process as claimed in claim 1 wherein said nitric acid employed in said oxidation is mixed with 1–25% by weight, based on the nitric acid, of an alpha-chlorocarboxylic acid prior to use of said nitric acid in said oxidation.

3. A process as claimed in claim 1 wherein the reaction is carried out at a temperature between 10° and 35° C.

4. A process as claimed in claim 1 wherein about 4 to 10 mols of nitric acid are used for each mol of bis-(1-nitroso-2-chlorohydrocarbon).

5. A process for the production of alpha-chloroisobutyric acid which comprises oxidizing bis-(1-nitroso-2-chloro-2-methylpropane) with nitric acid of a concentration between 60 and 98% by weight at a temperature between 0° and 50° C., at least 2 mols of nitric acid being used for each mol of the bis-(1-nitroso-2-chloro-2-methylpropane).

6. A process for the production of alpha-chlorophenylacetic acid which comprises oxidizing bis-(beta-nitroso-alpha-chloroethylbenzene) with nitric acid of a concentration between 60 and 98% by weight at a temperature between 0° and 50° C., at least two mols of nitric acid being used for each mol of the bis-(beta-nitroso-alpha-chloroethylbenzene).

References Cited in the file of this patent

Godt et al.: J.A.C.S., 78, pp. 1463–4 (1956).
Sidgwick: Organic Chemistry of Nitrogen, rewritten by Taylor et al., pp. 204–213 (1957). (Copies in library.)